US012623289B2

(12) United States Patent
Ren et al.

(10) Patent No.: US 12,623,289 B2
(45) Date of Patent: May 12, 2026

(54) MULTI-FIELD-ASSISTED LASER MELTING DEPOSITION COMPOSITE ADDITIVE MANUFACTURING SYSTEM

(71) Applicant: Tianjin University, Tianjin (CN)

(72) Inventors: Wenjing Ren, Tianjin (CN); Lianyong Xu, Tianjin (CN); Lei Zhao, Tianjin (CN); Yongdian Han, Tianjin (CN); Kangda Hao, Tianjin (CN)

(73) Assignee: Tianjin University, Tianjin (CN)

( * ) Notice: Subject to any disclaimer, the term of this patent is extended or adjusted under 35 U.S.C. 154(b) by 462 days.

(21) Appl. No.: 18/493,752

(22) Filed: Oct. 24, 2023

(65) Prior Publication Data

US 2025/0128331 A1    Apr. 24, 2025

(51) Int. Cl.
| | |
|---|---|
| *B22F 12/10* | (2021.01) |
| *B22F 10/28* | (2021.01) |
| *B22F 10/32* | (2021.01) |
| *B22F 10/64* | (2021.01) |
| *B22F 10/66* | (2021.01) |
| *B22F 10/85* | (2021.01) |
| *B22F 12/37* | (2021.01) |
| *B33Y 30/00* | (2015.01) |
| *B33Y 40/20* | (2020.01) |
| *B33Y 50/02* | (2015.01) |

(52) U.S. Cl.
CPC .............. *B22F 10/85* (2021.01); *B22F 10/28* (2021.01); *B22F 10/32* (2021.01); *B22F 10/64* (2021.01); *B22F 10/66* (2021.01); *B22F 12/10* (2021.01); *B22F 12/37* (2021.01); *B33Y 30/00* (2014.12); *B33Y 40/20* (2020.01); *B33Y 50/02* (2014.12)

(58) Field of Classification Search
CPC ...................................................... B22F 12/10
See application file for complete search history.

(56) References Cited

U.S. PATENT DOCUMENTS

| | | | | |
|---|---|---|---|---|
| 10,456,867 | B2 * | 10/2019 | Bamberg | .............. B29C 64/188 |
| 10,821,519 | B2 * | 11/2020 | Gold | ........................ B22F 10/28 |
| 11,318,564 | B2 * | 5/2022 | Ma | ........................... B22F 10/25 |
| 11,673,211 | B2 * | 6/2023 | Wu | ....................... B23K 26/342 |
| | | | | 219/76.1 |

FOREIGN PATENT DOCUMENTS

| | | |
|---|---|---|
| CN | 111451504 | 7/2020 |
| CN | 111590189 | 8/2020 |
| CN | 112264618 | 1/2021 |
| CN | 113976925 | 1/2022 |
| CN | 115229219 | 10/2022 |

* cited by examiner

*Primary Examiner* — Christopher S Kessler
(74) *Attorney, Agent, or Firm* — JCIPRNET

(57) ABSTRACT

The disclosure belongs to the field of advanced manufacturing technology and discloses a multi-field-assisted laser melting deposition composite additive manufacturing system. The system includes a vacuum chamber atmosphere protection module, a laser melting deposition module, an ultrasonic shock peening module, a workpiece transfer module, an auxiliary thermal field induction heating module, a laser shock peening module, and an integrated control module. The vacuum chamber atmosphere protection module, the laser melting deposition module, the ultrasonic shock peening module, the workpiece transfer module, the auxiliary thermal field induction heating module, and the laser shock peening module are electrically connected to the integrated control module individually and are collaboratively controlled by the integrated control module.

10 Claims, 5 Drawing Sheets

MULTI-FIELD-ASSISTED LASER MELTING DEPOSITION COMPOSITE ADDITIVE MANUFACTURING SYSTEM

BACKGROUND

Technical Field

The disclosure belongs to the field of advanced manufacturing technology, specifically concerning a multi-field-assisted laser melting deposition composite additive manufacturing system.

Description of Related Art

Additive manufacturing (AM) is a groundbreaking advanced manufacturing technology capable of directly 3D-printing parts from digital models layer by layer. Compared to conventional or subtractive manufacturing methods such as casting, forging, and machining, additive manufacturing significantly increases design freedom and reduces production time. Laser melting deposition (LMD) is an additive manufacturing technology based on laser cladding. It achieves rapid near-net-shape-forming manufacturing of parts by melting coaxially fed powder with a laser and depositing it layer by layer. In addition to the common advantages of additive manufacturing, laser melting deposition is less constrained by structural size, provides high molding efficiency, and is capable of rapidly molding and repairing gradient/composite materials. Laser melting deposition is currently one of the most typical metal additive manufacturing methods and has applications in automobile manufacturing, aerospace, shipbuilding, and other fields.

However, at present, effective laser melting deposition additive manufacturing primarily applies to metals like 316 stainless steel, 718 nickel-based alloys, TiAl6V4, etc., limiting the types of materials that can be used. High-performance materials like titanium-aluminum alloys, high-entropy alloys, and high-strength aluminum alloys often exhibit defects during the laser melting deposition process, resulting in printed parts with overall performance inferior to those manufacturing using equal/subtractive methods with the same material. The main issues stem from the inherent characteristics of conventional laser melting deposition: (1) The conventional process relies on a coaxial gas supply to provide inert gas protection during processing, but this protection is often inadequate, leading to air or inert gas infiltration into the molten pool causing pore defects. For oxygen-sensitive materials like aluminum alloys, a solid oxide film may form on the deposition surface during cooling, resulting in defects such as lack of fusion and slag inclusions between deposition layers. (2) In the laser additive manufacturing process, the high-energy laser interacts with metals briefly, with a small contact area. The "melting-solidification-cooling" process imposes large temperature gradients and cooling rates on the metals, causing significant internal stress, which results in cracks and fracturing. (3) Temperature gradients and cooling rates are key thermodynamic factors affecting the final microstructure of the molded part in the laser melting deposition process. The local microstructure experiences complex thermal effects as a result the deposited metal undergoes remelting and repeated thermal cycles during layer-by-layer stacking. This thermal effect is influenced not only by printing parameters but also by factors like part structure, size, and ambient temperature. Unreasonable temperature gradients and cooling rates lead to coarse columnar crystals and uneven microstructures, causing anisotropy, poor mechanical properties, and poor stability in deposited parts. These issues significantly limit the practical application of additive manufacturing technology for large and complex metal parts. Addressing these problems and improving gas protection internal stress control, defect reduction, microstructure optimization, isotropy, and mechanical properties have become crucial for fabricating large and complex metal components using additive manufacturing.

To address these challenges, the related art has explored ultrasonic shock peening (CN111590189A and CN111451504A) and laser shock peening (CN113976925A and CN112264618A) in additive manufacturing processes. By applying layer-by-layer shock treatments in additive manufacturing, these methods have shown promise in improving issues like coarse grain structure, increasing dislocation density, eliminating harmful residual stress, and enhancing comprehensive mechanical properties. However, these disclosed technologies can only address individual problems, and they employ single-field assisted methods to address issues in additive manufacturing. Challenges such as inadequate gas protection during additive manufacturing, effective control of temperature gradients and cooling rates, microstructure optimization, effective suppression of cracks and harmful internal stress, and the elimination of anisotropy cannot be fully resolved using these methods alone.

SUMMARY

Recognizing the shortcomings of the related art, the disclosure aims to introduce a multi-field-assisted laser melting deposition composite additive manufacturing system to address issues such as poor gas protection during additive manufacturing, difficulties in controlling temperature gradients and cooling rates, challenges in suppressing cracks and harmful internal stress, and issues related to anisotropy.

To achieve the above, the disclosure provides a multi-field-assisted laser melting deposition composite additive manufacturing system comprising a vacuum chamber atmosphere protection module, a laser melting deposition module, an ultrasonic shock peening module, a workpiece transfer module, an auxiliary thermal field induction heating module, a laser shock peening module, and an integrated control module.

The vacuum chamber atmosphere protection module includes a bunker. A vacuum pump, a dust removal and filtering device, a transition chamber, and an inert gas replenishing device are located outside the bunker and each individually connects to the bunker. The dust removal and filtering device is further linked to a circulating gas-washing device designed to cleanse the gas within the bunker and recycle the cleaned gas back into the bunker.

The laser melting deposition module is situated within the bunker and consisted of a deposition head, a translational movement device, a workpiece turntable, a laser, a powder feeding device, and a gas supply device. The translational movement device and the workpiece turntable are fixed within the bunker. The deposition head is mounted on the translational movement device, positioned above the workpiece turntable, and capable of translational movement along the device. The laser, powder feeding device and gas supply device are positioned outside the bunker. The laser is electrically connected to the deposition head, while both the powder feeding device and the gas supply device are connected to the deposition head.

The ultrasonic shock peening module includes an ultrasonic shock gun and an ultrasonic generator. The ultrasonic shock gun is fixed on the deposition head, with both processing ends oriented downward towards the workpiece turntable. The ultrasonic generator is positioned outside the bunker and communicates with the ultrasonic shock gun via electrical signals.

The workpiece transfer module is located on the workpiece turntable, featuring a base plate that is securely fixed on the workpiece transfer module. The workpiece transfer module can move horizontally to convey a molded part to be processed into or out of the transition chamber.

The auxiliary thermal field induction heating module is placed on the workpiece transfer module, situated on one side of the workpiece transfer module, and designed to heat the base plate and/or the molded part.

The laser shock peening module is positioned outside the bunker and is configured to perform laser shock peening on a molded part that has been processed via laser melting deposition inside the bunker.

The vacuum chamber atmosphere protection module, laser melting deposition module, ultrasonic shock peening module, workpiece transfer module, auxiliary thermal field induction heating module, and laser shock peening module are electrically connected to the integrated control module, which collaboratively controls their operation.

Further, the translational movement performed by the deposition head on the translational movement device includes left and right, front and rear, and up and down movements. Preferably, the deposition head can move within a movement stroke range of 0 mm to 800 mm in left and right movement, 0 mm to 800 mm in front and rear movement, and 0 mm to 800 mm in up and down movement on the translational movement device.

Additionally, the workpiece turntable comprises a base, two supporting parts, and a working platform from bottom to top. The base is affixed to the inner bottom surface of the bunker via a vertically arranged rotation axis and can rotate 360° around this axis. The two supporting parts are symmetrically arranged on the base, and the working platform is positioned between them, capable of flipping forward and backward within a limited angle range. Preferably, the limited angle range is 0° to 95° for backward flipping and 0° to 5° for forward flipping.

Further, the workpiece transfer module includes a horizontal sliding table and a base plate locking device from bottom to top. The horizontal sliding table can move horizontally, and the base plate locking device is fixed on the horizontal sliding table to secure the base plate.

Further, the auxiliary thermal field induction heating module comprises a temperature sensor, an electromagnetic induction coil, a lifting slider rail, and an electromagnetic induction heater. The lifting slider rail is fixed on the workpiece turntable or the bunker. Both the temperature sensor and the electromagnetic induction coil are attached to the lifting slider rail. The lifting slider rail can vertically move both the temperature sensor and the electromagnetic induction coil simultaneously. The electromagnetic induction heater is positioned outside the bunker and electrically connected to the electromagnetic induction coil. Preferably, the temperature sensor is positioned above the electromagnetic induction coil.

Further, the laser shock peening module includes a pulse laser, a robot, and a constraint layer laying device. The robot is responsible for transporting the molded part from the transition chamber to a laser shock-peening processing position. The constraint layer laying device is designed to apply a constraint layer to the surface of the molded part, while the pulse laser performs laser shock peening on the surface of the molded part with the constraint layer.

Further, the transition chamber includes a transition chamber outer door and a transition chamber inner door symmetrically situated at the left and right ends of the transition chamber. A base plate receiving structure is positioned on the inner bottom surface of the transition chamber. The transition chamber's inner door is located between the bunker and the transition chamber. The base plate receiving structure is intended to receive the base plate convey into the transition chamber. The transition chamber outer door, base plate receiving structure, and transition chamber inner door are all controlled by the integrated control module.

Further, an oxygen and water monitoring device is installed on an inner wall of the bunker to continuously monitor the oxygen and water content within the bunker.

Preferably, a pressure monitoring device is also installed on the inner wall of the bunker to monitor the air pressure within the bunker in real time.

Further, the pressure within the bunker is maintained between 10 mbar and 100 mbar in a vacuum state.

The technical solutions presented in this disclosure offer several advantages over the related art.

1. The disclosure introduces a composite additive manufacturing system designed with multiple field-assisted devices, such as the vacuum chamber atmosphere protection field, the auxiliary thermal field (i.e., the electromagnetic induction heating field), the ultrasonic shock peening field, and the laser shock peening deformation field. Each auxiliary field can be utilized individually or in various combinations. The overall system possesses comprehensive functions, with device structures that are logically laid out and complementary in terms of their functional roles. This design accommodates various laser melting deposition composite additive manufacturing needs, allowing for different combinations of different auxiliary fields. During processing, the composite process type and parameters can be freely adjusted based on material characteristics and manufacturing requirements making it suitable for additive manufacturing with various materials. This approach is of significant benefit in comprehensively addressing various issues, such as oxidation, coarse grains, harmful residual stress-induced cracks, and anisotropy, encountered during the additive manufacturing process.

2. In the disclosure, the translational movement device is provided to enable the deposition head and the ultrasonic shock gun mounted on the translational movement device, to move in the front and rear, left and right, and up and down directions within the composite additive manufacturing system. The workpiece turntable can rotate or flip, allowing for adjustments in the relative position between the workpiece and the deposition head or the ultrasonic shock gun. This flexibility enables the workpiece to be processed to adjust its orientation according to the processing path. By configuring the integrated control module to coordinate the movements of the translational movement device, workpiece turntable, workpiece transfer device, and other movement components, a multi-axis movement system for laser melting deposition can be created to achieve precise processing based on the planned laser melting deposition planning path.

3. The disclosure includes a transition chamber positioned outside the bunker, an inner door situated between the transition chamber and the bunker, and an outer door located at the opposite end of the transition chamber within the composite additive manufacturing system. When the inner door is opened, the preliminarily processed molded part can be transferred into the transition chamber using the workpiece transfer module installed within the chamber. The workpiece receiving structure in the transition chamber facilitates the insertion of the molded part into the transition chamber. Once done, the transition chamber's inner door can be closed, and the transition chamber's outer door can be opened to transfer the workpiece to be processed into or out of the chamber. This arrangement allows for the automatic transfer of workpieces in and out of the bunker without affecting the gas environment within. Further, after an experiment, samples can be removed or placed without disturbing the bunker's gas environment. Consequently, there is no need to evacuate and refill the bunker with inert gas for the next experiment, resulting in significant time and gas cost savings.

4. In the disclosure, the vacuum chamber atmosphere protection module within the composite additive manufacturing system exhibits excellent sealing performance and pressure-bearing capacity. The bunker is evacuated using the vacuum pump, while the inert gas replenishing device replenishes inert gas into the bunker to achieve rapid gas exchange. Further, after a single vacuum and inert gas fill cycle, the oxygen content can be controlled within the range of 200 ppm to 500 ppm, effectively saving time and inert gas costs. The gas within the bunker is initially purified by the dust removal and filtering device and then further cleansed by the connected circulating gas-washing device, reducing the oxygen content of the bunker gas. The purified gas is subsequently reintroduced into the bunker via pipelines. This approach enhances protection for materials with strict oxygen content requirements during layer-by-layer additive manufacturing. It also reduces manufacturing defects such as interlayer oxidation, pores, and slag inclusions, that can occur due to inadequate gas protection. Further, the circulating gas-washing device reintroduces gas purified in a two-stage process back into the bunker, saving on gas consumption and costs.

5. The disclosure allows the composite additive manufacturing system to simultaneously support two deformation field-assisted processing solutions: ultrasonic shock peening and laser shock peening. The system can select either shock peening method based on material characteristics and processing requirements. By utilizing the bunker and the workpiece transfer structure within the transition chamber, the workpiece to be processed can be transferred both inside and outside the bunker. Laser melting deposition is performed inside the bunker, while laser shock peening is carried out externally. This ensures that both processing technologies can work in conjunction to achieve laser melting deposition of composite additives, while also preventing the laser shock-induced water flow constraint layer from affecting the laser melting deposition environment.

6. In the disclosure, the vacuum chamber atmosphere protection field, the auxiliary thermal field (i.e., the electromagnetic induction heating field), and the ultrasonic shock peening field are positioned within the inert gas bunker. The laser deposition processing takes place inside the bunker, while the laser shock peening processing occurs outside the bunker. As a result, laser deposition processing and laser shock peening processing do not interfere with each other. Further, the laser melting deposition occurs within the vacuum chamber atmosphere protection field, reducing defects like pores and slag inclusion inside the component.

DESCRIPTION OF THE EMBODIMENTS

In order to make the objectives, technical solutions, and advantages of the disclosure clearer and more comprehensible, the disclosure is further described in detail with reference to the drawings and embodiments. It should be understood that the specific embodiments described herein serve to explain the invention merely and are not used to limit the invention.

Embodiment 1

Figure 1:
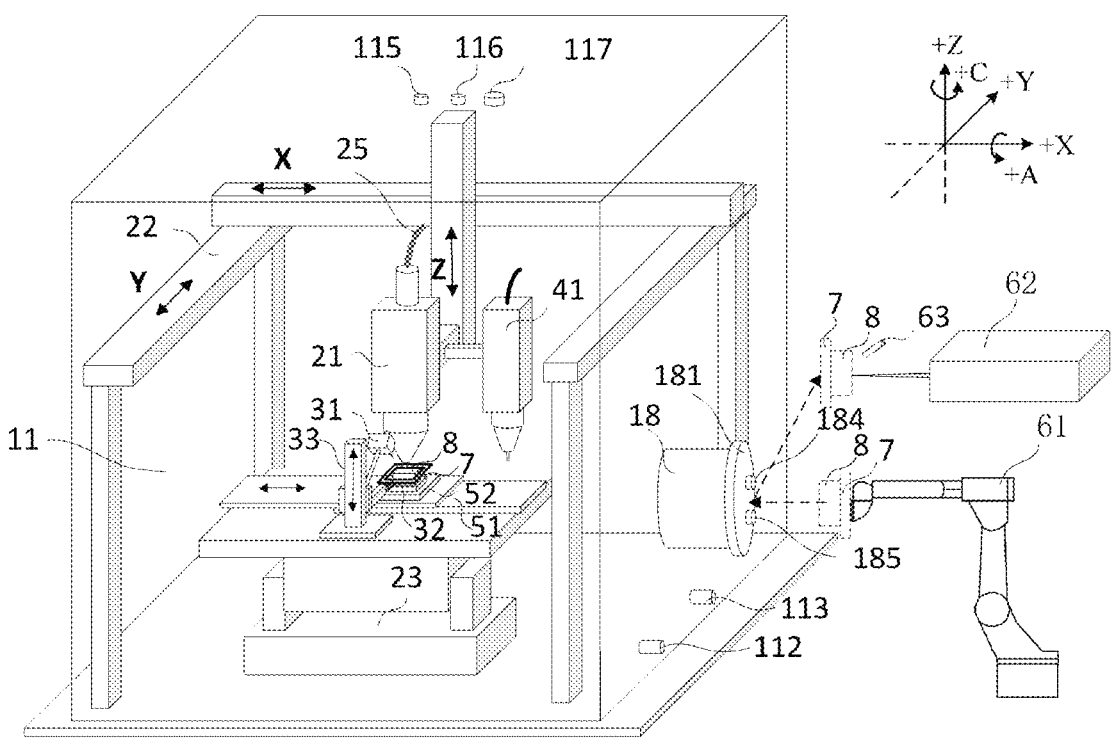
FIG. 1 is a schematic view of the structure of a multi-field-assisted laser melting deposition composite additive manufacturing system provided by an embodiment of the disclosure.

As shown in FIG. 1, this figure is a schematic view of the structure of a multi-field-assisted laser melting deposition composite additive manufacturing system provided by an embodiment of the disclosure. The system includes a vacuum chamber atmosphere protection module, a laser melting deposition module, an ultrasonic shock peening module, a workpiece transfer module, an auxiliary thermal field induction heating module, a laser shock peening module, and an integrated control module.

The vacuum chamber atmosphere protection module includes a bunker 11. A vacuum pump 12, a dust removal and filtering device 14, a transition chamber 18, and an inert gas replenishing device 14 are provided on a sidewall outside the bunker 11 and individually communicate with the body of the bunker 11. The dust removal and filtering device 14 is further connected to a circulating gas-washing device 15, and the circulating gas-washing device 15 is connected to the bunker 11 through an externally connected pipeline.

Preferably, the vacuum pump 12 and the dust removal and filtering device 14 are arranged on the left side surface outside the bunker 11, and the transition chamber 18 and the inert gas replenishing device 13 are arranged on the right side surface of the bunker 11. A door of the bunker 11 is arranged on the front side surface in the middle of the two side surfaces, and a visual window is arranged on the door for observing the processing conditions in the bunker.

Figure 2:
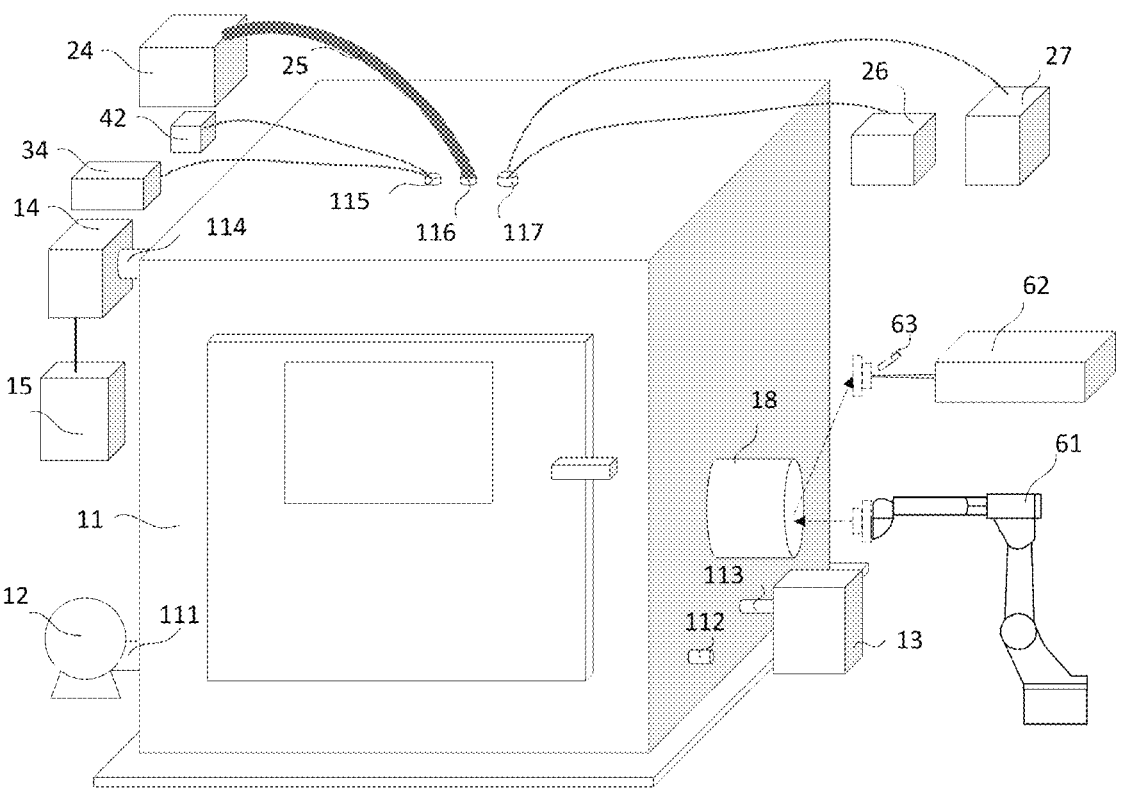
FIG. 2 is a schematic view of an external structure of the multi-field-assisted laser melting deposition composite additive manufacturing system provided by an embodiment of the disclosure.

More preferably, as shown in FIG. 2, this figure is a schematic view of the external structure of the multi-field-assisted laser melting deposition composite additive manufacturing system provided by an embodiment of the disclosure. The vacuum pump 12 is connected to a vacuum port 111 on the bunker 11 through a pipeline and is configured to evacuate the bunker 11. The inert gas replenishing device 13 is connected to a gas inlet 113 of the bunker 11 through a pipeline and is configured to fill the bunker 11 with inert gas. The dust removal and filtering device 14 is connected to a gas outlet 114 of the bunker 11 through a pipeline and is configured to filter the gas discharged from the bunker 11. The circulating gas-washing device 15 is connected to the dust removal and filtering device 14. The gas filtered by the dust removal and filtering device enters the circulating gas-washing device 15, and the oxygen and moisture in the gas are removed through purification. After that, a gas outlet of the circulating gas-washing device 15 is connected to a circulating gas inlet 112 through an externally connected pipeline, and the purified gas is returned to the bunker 11.

Figure 3:
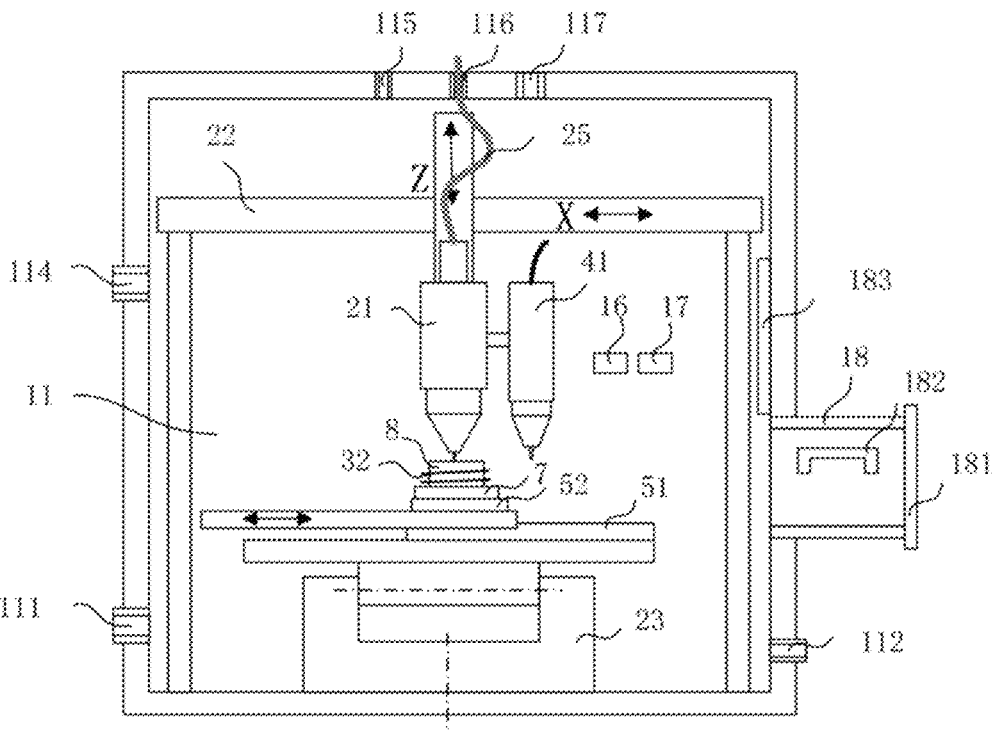
FIG. 3 is a schematic front view of the structure of a laser melting deposition module provided by an embodiment of the disclosure.

Preferably, as shown in FIG. 3, this figure is a front perspective view of the multi-field-assisted laser melting deposition composite additive manufacturing system. A water and oxygen monitoring device 16 and a pressure monitoring device 17 are also arranged on a bunker wall of the bunker 11 and are configured to monitor water and oxygen content and pressure value respectively in the bunker 11.

Preferably, the size of the bunker 11 is 1,800 mm×1,500 mm×2,000 mm, and the bunker 11 is made of carbon steel. The thickness of the bunker wall is preferably 28 mm, ensuring that the bunker 11 exhibits good sealing performance and pressure-bearing capacity. When a vacuum is created, the bunker 11 can withstand a minimum absolute pressure of 50 mbar. The vacuum pump 12 is preferably a multi-stage vacuum pump that combines a mechanical pump and a Roots pump, allowing the bunker 11 to be quickly evacuated, saving vacuuming time and costs, and reducing the amount of protective gas.

Figure 4:
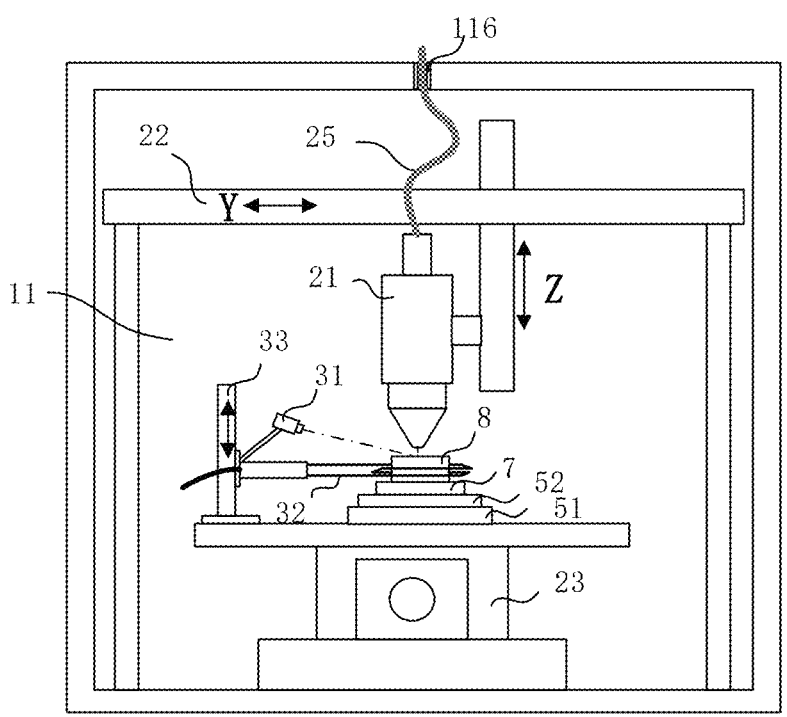
FIG. 4 is a schematic right view of the structure of the laser melting deposition module provided by an embodiment of the disclosure.

As shown in FIG. 3, this figure is a schematic front view of the structure of a laser melting deposition module, and as shown in FIG. 4, this figure is a schematic right view of the structure of the laser melting deposition module. The laser melting deposition module is arranged in the bunker 11 and includes a deposition head 21, a translational movement device 22, a workpiece turntable 23, a laser 24, a powder feeding device 26, and a gas supply device 27. Herein, the translational movement device 22 and the workpiece turntable 23 are arranged on the inner bottom surface of the bunker 11. The deposition head 21 is arranged on the translational movement device 22, located above the workpiece turntable 23, and is able to perform translational movement on the translational movement device 22. The laser 24, the powder feeding device 26, and the gas supply device 27 are all arranged outside the bunker 11. The laser 24 is connected to the deposition head 21 through an optical fiber 25 inserted into an optical fiber inlet 116 provided on the top portion of the bunker 11. The powder feeding device 26 and the gas supply device 27 are connected to the deposition head 21 through a pipeline penetrating into the bunker from a powder feeding and gas supply pipe inlet 117 provided on the top portion of the bunker 11. A signal line entrance and exit 115 is also arranged on the top portion of the bunker 11, which is used to implement signal communication between various structures that require electrical signal communication inside and outside the bunker. When working, the laser 24 generates laser light, and the laser light is collimated and focused by the deposition head 21, is then projected onto a surface metal of a molded part to form a molten pool, and melts the powder fed coaxially with the laser to implement layer-by-layer manufacturing.

Preferably, the translational movement device 22 in this embodiment includes two sets of gantry frames and a horizontally arranged connecting frame. Cross beams of the two sets of gantry frames are respectively arranged in the front and rear directions, that is, parallel to the Y-axis direction, and the gantry frames are symmetrically fixed on the left and right sides of the inner bottom surface of the bunker 11. The connecting frame is perpendicular to the cross beams of the two gantry frames, that is, the connecting frame is parallel to the X-axis direction. Both ends of the connecting frame are connected to the cross beams of the two sets of gantry frames to form a set of three-dimensional gantry frame translational movement devices 22. A guide rail is provided on the cross beam of each gantry frame, and a motor is provided at one end of the guide rail. The motor provides power to drive the deposition head 21 to move forward and backward relative to the translational movement device. The connecting frame is also provided with a guide rail and a motor. The motor can drive the deposition head 21 to translate left and right along the guide rail relative to the translational movement device. A longitudinal beam is fixed vertically on the connecting frame, and a guide rail and a motor are also provided on the longitudinal beam. The deposition head 21 is arranged in the guide rail and can perform translational movement in the up and down direction along the guide rail driven by the motor. The connecting frame is also provided with a guide rail and a motor, and the longitudinal beam is arranged in the guide rail on the connecting frame and can drive the deposition head 21 to translate left and right under the driving of the motor. In this way, the deposition head 21 can arbitrarily translate forward and backward (i.e., the Y-axis direction), left and right (i.e., the X-axis direction), or up and down (i.e., the Z-axis direction), so a processing position may thus be arbitrarily adjusted.

More preferably, the aforementioned gantry frames are replaced with two supporting frames with guide rails, and the two supporting frames are fixed horizontally and symmetrically on both sidewalls of the bunker. The connecting frame is perpendicular to the two supporting frames, and its two ends are connected to the two supporting frames, so that the deposition head can move in translation on any supporting frame or on the connecting frame.

More preferably, the guide rail on the translational movement device 22 may also be replaced by a sliding groove or any other structure that allows the deposition head to move translationally on the gantry frame, the connecting frame, or the supporting frame.

More preferably, the translational movement device 22 may also be a movement robot disposed in the bunker. The movement robot includes a movement part, and the movement robot is also equipped with a movement control system. The deposition head 21 is fixed on the movement part, and the movement control system controls the movement part to perform translational movement in any direction, so that the deposition head 21 may achieve changes in a processing path.

Figure 7:
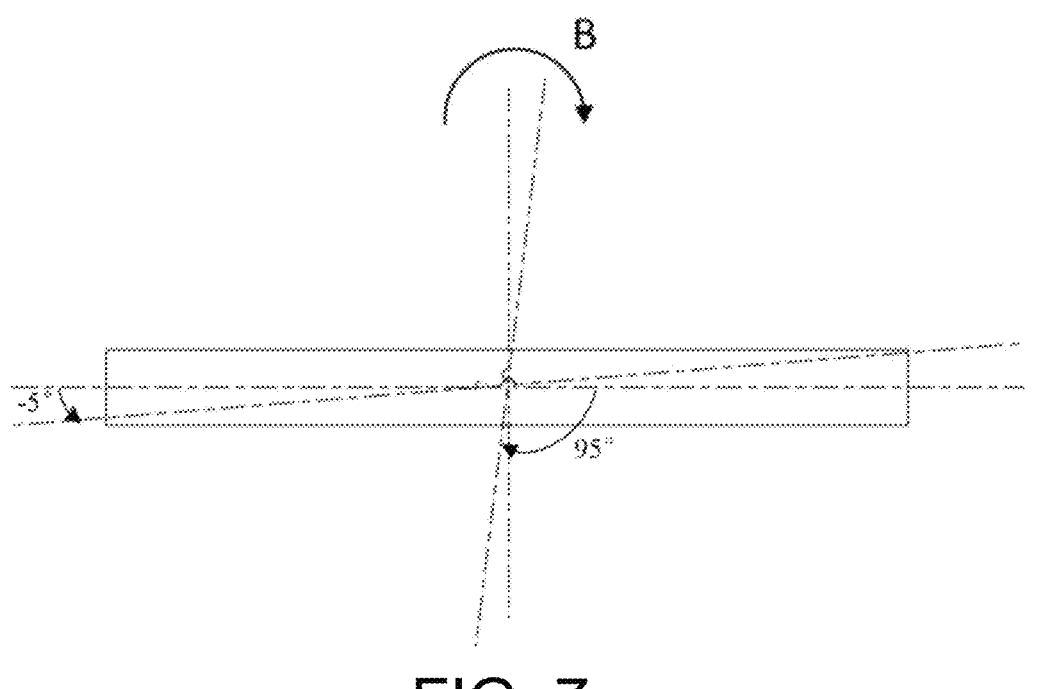
FIG. 7 is a schematic right view of a working platform in a flipping direction provided by an embodiment of the disclosure.

Preferably, the workpiece turntable 23 includes a base, two supporting parts, and a working platform from bottom to top. The base is fixed on the inner bottom surface of the bunker 11 through a vertically arranged rotation axis and is able to rotate 360° infinitely in a C direction around the rotation axis or in the opposite direction of the C direction. The two supporting parts are symmetrically arranged on the base, and the working platform is positioned between the two supporting parts. The working platform may be flipped forward and backward within a limited angle range in an A direction or in the opposite direction of the A direction. As shown in FIG. 7, this figure is a schematic right view of the working platform in a flipping direction. The limited angle range is 0° to 95° clockwise in a direction B, and 0° to –5° counterclockwise in the opposite direction of the direction B, allowing for precise adjustment of the posture of a molded part 8 according to the processing path, without interfering with other devices in the bunker due to over-adjustment.

The workpiece transfer module is positioned on the workpiece turntable 23 and is configured to lock a base plate 7.

Preferably, the workpiece transfer module consisted of a horizontal sliding table 51 and a base plate locking device 52 from bottom to top. The horizontal sliding table 51 is fixed onto the working platform of the workpiece turntable 23 and can move left and right relative to the working platform. The base plate locking device 52 is fixed onto the horizontal sliding table 51 and is configured to lock the base plate 7. The integrated control module can control the horizontal sliding table and the base plate locking device to perform actions.

Preferably, the transition chamber 18 includes a transition chamber outer door 181 and a transition chamber inner door 183 symmetrically arranged at the left and right ends of the transition chamber 18, as well as a base plate receiving structure 182 positioned on the inner bottom surface of the transition chamber 18. The transition chamber inner door 183 is located between the bunker 11 and the transition chamber 18. The base plate receiving structure is configured to receive the base plate 7 sent into the transition chamber 18. The transition chamber outer door 181, the base plate receiving structure 182, and the transition chamber inner door 183 all move under the control of the integrated control module. Preferably, the two doors can slide up and down to open and close, or the transition chamber inner door 183 may open towards the inside of the bunker and the transition chamber outer door 181 can open towards the outside of the bunker.

The auxiliary thermal field induction heating module is positioned on the workpiece turntable 23, and is located on one side of the workpiece transfer module. It is configured to heat the base plate 7 and the molded part to be processed.

Preferably, the auxiliary thermal field induction heating module consisted of a temperature sensor 31, an electromagnetic induction coil 32, a lifting slider rail 33, and an electromagnetic induction heater 34. The lifting slider rail 33 is fixed on the workpiece turntable 23 or can be fixed onto the inner bottom surface of the bunker 11. The temperature sensor 31 and the electromagnetic induction coil 32 are both fixed on the lifting slider rail 33 and are arranged up and down at the same position. The electromagnetic induction heater 34 is located outside the bunker and established electrical signal communication with the electromagnetic induction coil 32 through a signal line penetrating through the signal line entrance and exit 115. The integrated control module controls the lifting slider rail 33 to move up and down, which in turn moves the temperature sensor 31 and the electromagnetic induction coil 32 up and down. This ensures that as the number of deposited layers increases, the distance between temperature sensor 31 and the electromagnetic induction coil 32 remains unchanged. The temperature sensor 31 preferably uses a two-color thermometer, focusing on the surface of the base plate 7 to heat it and subsequently heat the molded part 8.

Figure 5:
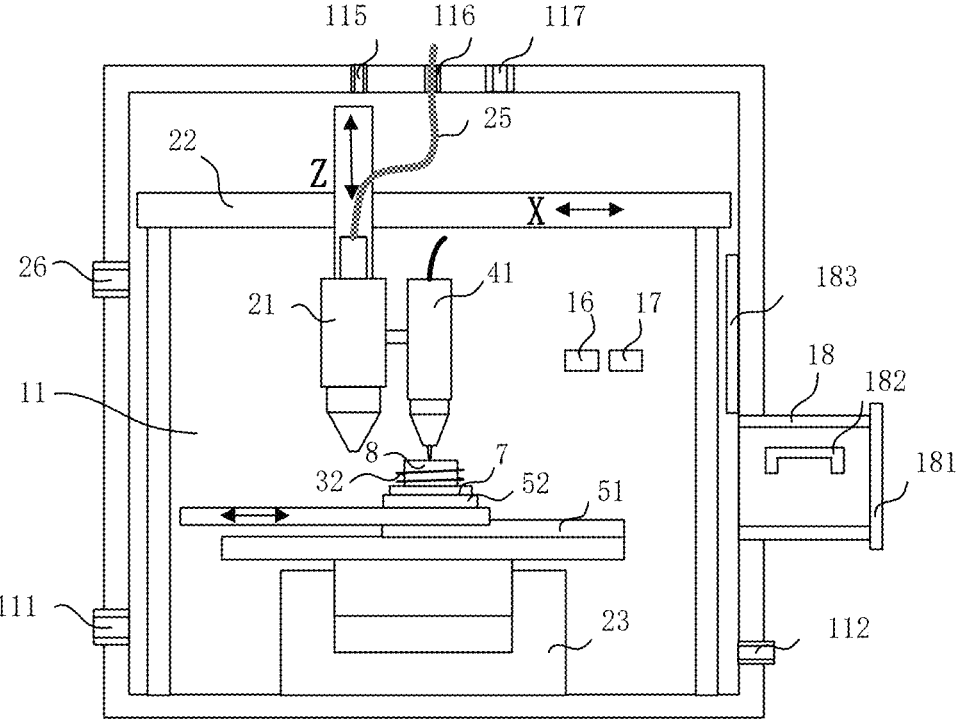
FIG. 5 is a schematic view of a structure in which a deposition head moves to the left to drive an ultrasonic shock peening module to move directly above a workpiece to be processed provided by an embodiment of the disclosure.

The ultrasonic shock peening module includes an ultrasonic shock gun 41 and an ultrasonic generator 42. The ultrasonic shock gun 41 is fixed side by side on the deposition head 21. The ultrasonic generator 42 is positioned outside the bunker and is connected to the ultrasonic shock gun 41 through the signal line penetrating through the signal line entrance and exit 115 provided at the top portion of the bunker. The deposition head 21 can drive the ultrasonic shock gun 41 on the translational movement device 22 to move forward and backward, left and right, or up and down. Preferably, its movement range is 800 mm×800 mm×800 mm, and this range can avoid interference with other devices in the bunker during movement. As shown in FIG. 5, this figure is a schematic view in which the deposition head 21 moves to the left to position the ultrasonic shock gun 41 directly above the molded part 8.

The temperature sensor 31 maintains communication with the electromagnetic induction heater 34. When the temperature measured by the temperature sensor 31 is lower than a set value, the electromagnetic induction heater 34 increases the power, causing the temperature sensor 31 to heat the base plate 7 and raise its temperature. When the temperature measured by the temperature sensor 31 is higher than the set value, the electromagnetic induction heater 34 stops or reduces the power, allowing the temperature of the base plate 7 to decrease.

The laser shock peening module is positioned outside the bunker 11 and is designed to perform laser shock peening on a molded part obtained after single-layer or multi-layer laser melting deposition processing in the bunker 11.

Preferably, the laser shock peening module includes a pulse laser 62, a robot 61, and a constraint layer laying device 63. As shown in FIG. 3, after the workpiece transfer module transfers the workpiece to be processed (i.e., the molded part 8) fixed onto the base plate 7 from a laser melting deposition station in the bunker 11 to the transition chamber 18, the robot 61 clamps the base plate 7 from an outer door of the transition chamber and moves the molded part 8 to the laser shock peening station.

The vacuum chamber atmosphere protection module, the laser melting deposition module, the ultrasonic shock peening module, the workpiece transfer module, the auxiliary thermal field induction heating module, and the laser shock peening module are all electrically connected to the integrated control module individually and are collaboratively controlled by the integrated control module.

Preferably, the integrated control module comprises an industrial computer, a data acquisition card, and mounted control software. The industrial computer and the data acquisition card communicate with each device in the additive manufacturing system through signal lines. The industrial computer receives the relevant parameters collected by the data acquisition card and controls the vacuum chamber atmosphere protection module in the system through the mounted control software. The inert gas replenishing device is controlled to fill the bunker with inert gas first to replace the gas in the bunker. Further, a gas filtering device and a circulating gas-washing device are controlled to purify the displaced gas and refill it in the bunker. Once a processing environment in the bunker is established, the auxiliary thermal field is controlled to preheat the base plate. After the processing environment in the bunker is formed, inert gas is continuously introduced into the bunker, and simultaneously, the laser melting deposition module is controlled to perform laser melting deposition additive manufacturing. After the multi-layer manufacturing is completed, the workpiece transfer module is controlled to transport the molded part to the processing environment where the laser shock peening module is located. During this time, the vacuum chamber atmosphere protection module may still be controlled to operate and maintain the gas environment in the bunker for subsequent processing. Outside the bunker, the laser shock peening module is controlled to lay a constraint layer on a processing surface of the molded part and then perform laser shock peening processing. After the processing, the molded part is returned to the bunker. In addition, after the multi-layer manufacturing is completed, the translational movement device and the ultrasonic shock peening module can be further controlled to perform ultrasonic shock peening on the surface of the deposited part. These control steps may be repeated until a complete part is obtained. During the control process of the control software, the auxiliary thermal field induction heating module and the laser shock peening module collaborate together, including controlling the path and speed of each movement device, controlling the start and stop of each device, adjusting the main process processing parameters, controlling the reception and transmission of sensor data, and controlling the supply of gas, cooling water and powder materials.

Embodiment 2

The vacuum chamber atmosphere protection module can provide an inert atmosphere protection field for laser melting deposition, and the implementation method is as follows.

The gas in the bunker 11 is extracted through the vacuum pump 12 until the absolute pressure of the gas in the bunker reaches 50 mbar. The inert gas replenishing device 13 fills the bunker 11 with argon gas through the gas inlet 113 until standard atmospheric pressure is reached. After a single vacuuming and argon replenishment reaches the atmospheric pressure, the oxygen content in the bunker 11 stabilizes within the range of 200 ppm to 500 ppm. After that, the gas in the bunker is gradually purified through the dust removal and filtering device 14 and the circulating gas-washing device 15. The purified gas is sent from the circulating gas-washing device 15 through the circulating gas inlet 112 into the bunker 11 through the pipeline, achieving gas replacement. Eventually, the oxygen content in the bunker can reach 50 ppm and remain within the range of 50 ppm to 200 ppm. During the additive manufacturing process, the dust removal and filtering device 14 and the circulating gas-washing device 15 can be used to replace the gas in the bunker ensuring that the oxygen content in the bunker remains within the set range.

The working principle of the circulating gas-washing device 15 for replacing the gas in the bunker 11 is as follows. A circulating fan is used to extract the gas from the bunker 11 and send it to the dust removal and filtering device 14. After solid particles are filtered and removed, the gas is sent to the circulating gas-washing device 15. In the circulating gas-washing device 15, oxygen in the gas is removed through an oxidation-reduction reaction, and moisture in the gas is absorbed, achieving gas purification. The purified gas is then returned to the bunker through the circulating gas inlet 112, effectively conserving protective gas.

When replacing the gas in the bunker 11 with an inert gas, inert gas is introduced into the bunker 11 through the gas replenishing device 13, and the original gas in the bunker 11 is simultaneously evacuated through the vacuum pump until the water and oxygen content and the pressure value in the bunker 11 reach the target values. Compared to the method of first vacuuming and then introducing an inert gas, this method takes longer to execute and requires a larger quantity of inert gas.

Embodiment 3

In the system provided by the disclosure, the molded part 8 can be transferred inside and outside the bunker 11 without affecting the gas environment of the bunker 11. The specific implementation method is as follows.

Figure 6:
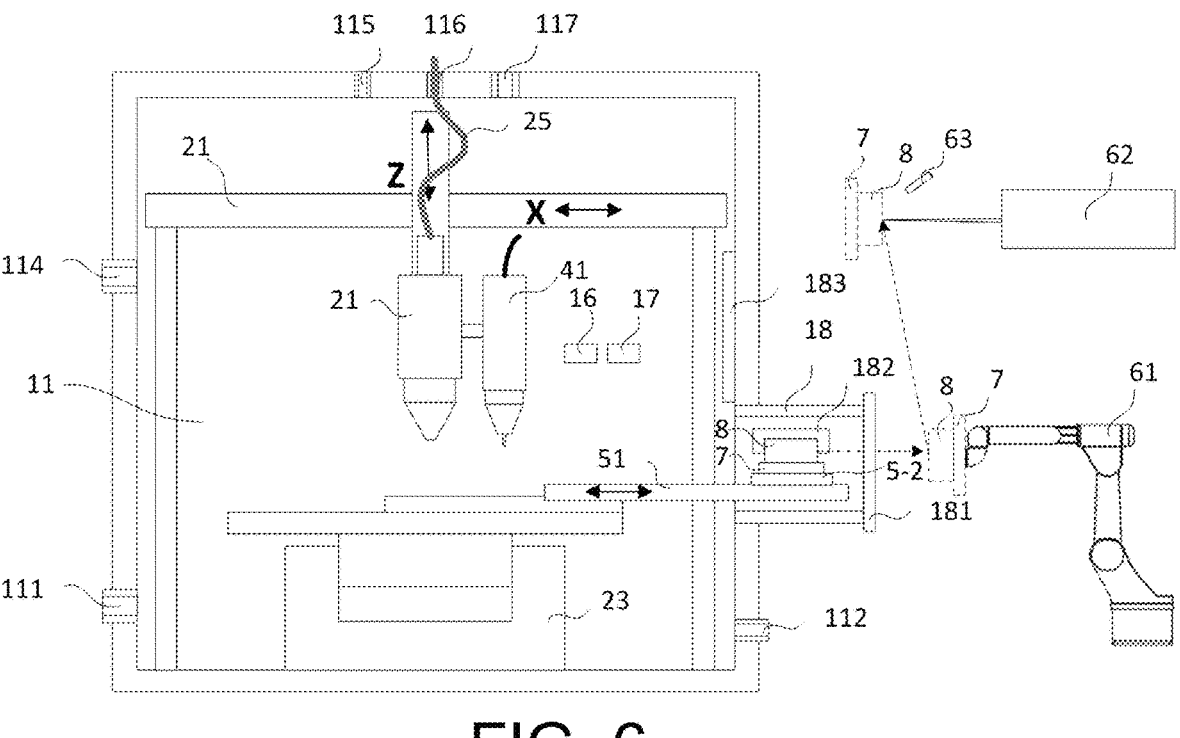
FIG. 6 is a schematic view of a robot transferring a molded part to a laser shock peening station provided by an embodiment of the disclosure.

As shown in FIG. 3, the horizontal sliding table 51 moves horizontally along the X-axis, moving the base plate locking device 52, the base plate 7, and the molded part 8 arranged sequentially from bottom to top. The transition chamber inner door 183 opens automatically until the structures are transported into the transition chamber 18. Then, the integrated control module controls the base plate locking device 52 to automatically unlock and transfer the base plate 7 and the molded part 8 onto the base plate receiving device 182 in the transition chamber 18. After that, the horizontal sliding table 51 exits the transition chamber 18, the transition chamber inner door 183 is automatically closed, and the transition chamber outer door 181 is opened. The robot 61 clamps the base plate 7 from the transition chamber, takes the molded part 8 on it outside to the laser shock peening station, and completes the transfer of the molded part 8 from the inside of the bunker 11 to the outside of the bunker 11. During this process, the water oxygen content, and the pressure in the bunker 11 are not affected. The molded part 8 can be transferred between the bunker 11 and the transition chamber 18 through the workpiece transfer module. The molded part 8 is further transferred between the transition chamber 18 and the laser shock peening station through the robot 61. As shown by the dotted arrow in FIG. 6, this represents the process in which the robot 61 transfers the molded part 8 to the laser shock peening station.

When the molded part 8 is sent from the outside of the bunker 11 through the transition chamber 18 into the bunker 11, the transition chamber outer door 181 is opened, the base plate 7 is fixed onto the base plate receiving device 182 in the transition chamber, and then the transition chamber outer door 181 is closed. Inert gas is introduced into the transition chamber 18 through the gas inlet provided on the transition chamber to equalize the gas environment in the transition chamber 18 with that in the bunker 11. The integrated control module controls the transition chamber inner door 183 to slide upward and open and controls the workpiece transfer module to move into the transition chamber 18. The base plate 7 is locked through the base plate locking device, and the base plate receiving device 182 in the transition chamber releases its locking of the base plate. Finally, the movement of the horizontal sliding table 51 is controlled to transport the molded part on the base plate to the laser melting deposition station. In this process, the gas environment in the bunker 11 may not be affected by the presence of the transition chamber.

The above description constitutes only preferred embodiments of the disclosure and is not intended to limit the disclosure. Any modifications, equivalent replacements, and changes made without departing from the spirit and principles of the disclosure should fall within the scope of protection of the disclosure.

What is claimed is:

1. A multi-field-assisted laser melting deposition composite additive manufacturing system, comprising a vacuum chamber atmosphere protection module, a laser melting deposition module, an ultrasonic shock peening module, a workpiece transfer module, an auxiliary thermal field induction heating module, a laser shock peening module, and an integrated control module, wherein the vacuum chamber atmosphere protection module comprises a bunker, a vacuum pump, a dust removal and filtering device, a transition chamber, and an inert gas replenishing device are provided outside the bunker and individually communicates with the interior of the bunker, the dust removal and filtering device is further connected to a circulating gas-washing device designed to wash the gas inside the bunker and reintroduce the washed gas into the bunker, the laser melting deposition module is arranged inside the bunker and comprises a deposition head, a translational movement device, a workpiece turntable, a laser, a powder feeding device, and a gas supply device, the translational movement device and the workpiece turntable are fixed within the bunker, the deposition head is positioned on the translational movement device, located above the workpiece turntable, and capable of performing a translational movement on the translational movement device, the laser, the powder feeding device and the gas supply device are all located outside the bunker, the laser is connected to the deposition head via an optical fiber, and the powder feeding device and the gas supply device are individually connected to the deposition head, the ultrasonic shock peening module comprises an ultrasonic shock gun and an ultrasonic generator, the ultrasonic shock gun is fixed on the deposition head, and processing ends of the deposition head and the ultrasonic shock gun face downward toward the workpiece turntable, the ultrasonic generator is located outside the bunker and communicates with the ultrasonic shock gun via an electrical signal, the workpiece transfer module is positioned on the workpiece turntable, and a base plate is affixed to the workpiece transfer module, the workpiece transfer module can move horizontally to transport a molded part to be processed into or out of the transition chamber, the auxiliary thermal field induction heating module is located on one side of the workpiece transfer module and is designed to heat the base plate and/or the molded part, the laser shock peening module is situated outside the bunker and is used for performing laser shock peening on a molded part processed by laser melting deposition within the bunker, and the vacuum chamber atmosphere protection module, the laser melting deposition module, the ultrasonic shock peening module, the workpiece transfer module, the auxiliary thermal field induction heating module, and the laser shock peening module are electrically connected to the integrated control module individually and are collaboratively controlled by the integrated control module.

2. The multi-field-assisted laser melting deposition composite additive manufacturing system according to claim 1, wherein the translational movement performed by the deposition head on the translational movement device comprises a left and right movement, a front and rear movement, and an up and down movement, and preferably, the deposition head can move within a movement stroke range of 0 mm to 800 mm in the left and right movement, within a movement stroke range of 0 mm to 800 mm in the front and rear movement and within a movement stroke range of 0 mm to 800 mm in the up and down movement on the translational movement device.

3. The multi-field-assisted laser melting deposition composite additive manufacturing system according to claim 1, wherein the workpiece turntable comprises a base, two supporting parts, and a working platform from bottom to top, the base is fixed on an inner bottom surface of the bunker through a vertically-arranged rotation axis and can rotate 360° around the vertically-arranged rotation axis, the two supporting parts are symmetrically arranged on the base, and the working platform is installed between the two supporting parts and can be flipped forward and backward within a limited angle range, and preferably, the limited angle range is 0° to 95° for backward flipping and 0° to 5° for forward flipping.

4. The multi-field-assisted laser melting deposition composite additive manufacturing system according to claim 1, wherein the workpiece transfer module comprises a horizontal sliding table and a base plate locking device from bottom to top, the horizontal sliding table can move horizontally in translation, and the base plate locking device is fixed on the horizontal sliding table for locking the base plate.

5. The multi-field-assisted laser melting deposition composite additive manufacturing system according to claim 1, wherein the auxiliary thermal field induction heating module comprises a temperature sensor, an electromagnetic induction coil, a lifting slider rail, and an electromagnetic induction heater, the lifting slider rail is fixed on the workpiece turntable or the bunker, the temperature sensor and the electromagnetic induction coil are both fixed on the lifting slider rail, the lifting slider rail can drive the temperature sensor and the electromagnetic induction coil to move up and down synchronously, the electromagnetic induction heater is located outside the bunker and communicates with the electromagnetic induction coil, and preferably, the temperature sensor is arranged above the electromagnetic induction coil.

6. The multi-field-assisted laser melting deposition composite additive manufacturing system according to claim 1, wherein the laser shock peening module comprises a pulse laser, a robot, and a constraint layer laying device, the robot is configured to transport the molded part from the transition chamber to a laser shock peening processing position, the constraint layer laying device is configured to lay a constraint layer on a surface of the molded part, and the pulse laser is configured to perform laser shock peening on the surface of the molded part laid with the constraint layer.

7. The multi-field-assisted laser melting deposition composite additive manufacturing system according to claim 1, wherein the transition chamber comprises a transition chamber outer door and a transition chamber inner door symmetrically arranged at a left end of the transition chamber and a right end of the transition chamber and a base plate receiving structure arranged on an inner bottom surface of the transition chamber, wherein the transition chamber inner door is located between the bunker and the transition chamber, the base plate receiving structure is configured to receive the base plate sent into the transition chamber, and the transition chamber outer door, the base plate receiving structure, and the transition chamber inner door all move under the control of the integrated control module.

8. The multi-field-assisted laser melting deposition composite additive manufacturing system according to claim 1, wherein a water and oxygen monitoring device is further arranged on an inner wall of the bunker for real-time monitoring of a water and oxygen content in the bunker.

9. The multi-field-assisted laser melting deposition composite additive manufacturing system according to claim 8, wherein a pressure monitoring device is further arranged on the inner wall of the bunker for real-time monitoring of an air pressure in the bunker.

10. The multi-field-assisted laser melting deposition composite additive manufacturing system according to claim 1, wherein a pressure inside the bunker is between 10 mbar and 100 mbar in a vacuum state.

* * * * *